(12) United States Patent
Watanabe et al.

(10) Patent No.: US 10,329,424 B2
(45) Date of Patent: Jun. 25, 2019

(54) SILICONE COMPOSITION

(71) Applicant: POLYMATECH JAPAN CO., LTD., Saitama, Saitama (JP)

(72) Inventors: Yasuyoshi Watanabe, Saitama (JP); Gaku Kitada, Saitama (JP)

(73) Assignee: POLYMATECH JAPAN CO., LTD., Saitama (JP)

( * ) Notice: Subject to any disclaimer, the term of this patent is extended or adjusted under 35 U.S.C. 154(b) by 0 days.

(21) Appl. No.: 15/523,567

(22) PCT Filed: Dec. 25, 2014

(86) PCT No.: PCT/JP2014/084417
§ 371 (c)(1),
(2) Date: May 1, 2017

(87) PCT Pub. No.: WO2016/103424
PCT Pub. Date: Jun. 30, 2016

(65) Prior Publication Data
US 2017/0313881 A1    Nov. 2, 2017

(51) Int. Cl.
H01B 1/20 (2006.01)
C09D 5/24 (2006.01)
C08L 83/04 (2006.01)
C08K 3/22 (2006.01)
C08K 3/36 (2006.01)
C09K 5/14 (2006.01)
C08L 1/02 (2006.01)
C08L 3/02 (2006.01)
C08G 77/20 (2006.01)
C08L 5/00 (2006.01)

(52) U.S. Cl.
CPC ............... *C08L 83/04* (2013.01); *C08K 3/22* (2013.01); *C08K 3/36* (2013.01); *C09D 5/24* (2013.01); *C09K 5/14* (2013.01); *H01B 1/20* (2013.01); *C08G 77/20* (2013.01); *C08K 2003/2227* (2013.01); *C08K 2201/001* (2013.01); *C08L 1/02* (2013.01); *C08L 3/02* (2013.01); *C08L 5/00* (2013.01)

(58) Field of Classification Search
CPC ... H01B 1/00; H01B 1/16; H01B 1/18; H01B 1/22; H01B 1/24; C09D 5/24; C08K 3/00; C08K 3/22
See application file for complete search history.

(56) References Cited

U.S. PATENT DOCUMENTS

| | | | |
|---|---|---|---|
| 6,361,716 B1* | 3/2002 | Kleyer | C08K 5/0091 252/514 |
| 2010/0239871 A1* | 9/2010 | Scheffer | C09D 7/70 428/447 |
| 2011/0188213 A1 | 8/2011 | Domae et al. | |
| 2012/0061625 A1* | 3/2012 | Eckert | C09D 5/24 252/514 |
| 2012/0280169 A1 | 11/2012 | Kato et al. | |
| 2013/0137613 A1 | 5/2013 | Kato et al. | |
| 2013/0267628 A1 | 10/2013 | Del Torto | |
| 2015/0249167 A1* | 9/2015 | Zhang | H01B 1/22 427/123 |

FOREIGN PATENT DOCUMENTS

| | | |
|---|---|---|
| JP | 09-059125 A | 3/1997 |
| JP | 2000-072646 A | 3/2000 |
| JP | 2002-226819 A | 8/2002 |
| JP | 2004-091743 A | 3/2004 |
| JP | 2005-330426 A | 2/2005 |
| JP | 2005-255968 A | 9/2005 |
| JP | 3957596 B2 | 8/2007 |
| JP | 2009-221311 A | 3/2008 |
| JP | 2009-286855 A | 12/2009 |
| JP | 2011-140566 A | 7/2011 |
| JP | 2012-007057 A | 1/2012 |
| JP | 2012-052137 A | 3/2012 |
| JP | 2014-502648 A | 2/2014 |
| JP | 2014-105283 A | 6/2014 |
| WO | WO2014/059577 A1 | 4/2014 |

OTHER PUBLICATIONS

Sigma-Aldrich Product Data Sheet Sorbitol powder (No pub date).*
International Search Report for PCT Patent App. No. PCT/JP2014/084417 (dated Apr. 7, 2015).
Office Action from Japanese Patent App. No. 2016-565779 (dated Feb. 8, 2019), (No English language translation provided).

* cited by examiner

*Primary Examiner* — Mark Kopec
(74) *Attorney, Agent, or Firm* — Cermak Nakajima & McGowan LLP; Tomoko Nakajima

(57) ABSTRACT

The silicone composition is one that contains liquid silicone, at least one insoluble functionalizing filler, such as a thermally or electrically conductive filler, and a non-liquid anti-thickening or non-thickening anti-settling material, such as a cellulose compound or polysaccharide. In a system that contains liquid silicone and insoluble functionalizing filler(s), a polysaccharide functions as an anti-thickening or non-thickening anti-settling material, providing a low-viscosity and filler-rich silicone composition.

7 Claims, No Drawings

SILICONE COMPOSITION

This application is a national phase entry under 35 U.S.C. § 371 of PCT Patent Application No. PCT/JP2014/084417, filed on Dec. 25, 2014, which is incorporated by reference.

TECHNICAL FIELD

The present invention relates to a liquid-silicone-based silicone composition having thermal conductivity or other functions. In particular, the present invention relates to a silicone composition to be placed between a heating element and a heat-dissipating element to be used as a thermal grease that combines thermal conductivity and storage stability.

BACKGROUND ART

Electronic devices such as computers and automobile components use a heat-dissipating element, such as a heat sink, to dissipate the heat generated by a heating element, such as a semiconductor device or a mechanical component. To make the heat transfer efficient, thermal grease may be applied to fill the space between the heating and heat-dissipating elements.

The thermal grease has a low thermal conductivity compared to the heating element and the heat-dissipating element (typically made of metal); thus, thin layers are advantageous over thick ones. If the purpose is to eliminate any air layer, which has a very low thermal conductivity, from the interface between the heating and heat-dissipating elements, a low-viscosity and high-fluidity thermal grease is more advantageous. For these reasons, it is known to use a low-viscosity thermal grease when the heating and heat-dissipating elements are narrowly spaced. For example, Japanese Unexamined Patent Application Publication No. 2005-330426 states that when the particle diameter of a thermally conductive filler is "greater than 15.0 µm, the silicone grease composition cannot be applied in a sufficiently thin layer and thus is less effective in dissipating heat."

In recent years, however, many kinds of elements generate heat, and the total heat generation is also increasing. It is thus desired to dissipate heat from multiple electronic elements or from throughout the entire substrate rather than from one particular electronic element. This means that the electronic elements from which heat is being dissipated vary in height, and that a heat-dissipating element may be fit to a diagonally or horizontally positioned heating element in some cases. The forms required for heat dissipation have been diversifying.

A solution to these demands is to use a known thermal grease, usually used as a thin film, in the form of a thick film, but this has the disadvantage of less efficient heat transfer. This is because resin compositions that contain a small-particle-diameter thermally conductive filler can be formed into a thin film for efficient heat transfer, but on the other hand tend to have a low thermal conductivity compared to resin compositions that also contain a large-particle-diameter thermally conductive filler. It is therefore desired to use a thermal grease that contains a thermally conductive filler having a large particle diameter is used as a thick film.

However, thermal greases containing a large-particle-diameter thermally conductive filler have a disadvantage in that the filler easily settles down and separates out of the base oil. For example, Japanese Unexamined Patent Application Publication No. 2012-052137 states, regarding a thermally conductive filler which is preferably 50 µm or less, "Too large an average particle diameter can cause oil separation to proceed readily." Furthermore, Japanese Unexamined Patent Application Publication No. 2009-221311 states, "An average particle diameter exceeding 30 µm affects the stability of the composition, which makes oil separation more likely to occur."

A known solution to these problems is to use a thickening or thixotropic additive, such as silica, to prevent the settlement of the thermally conductive filler. This is described in, for example, Japanese Unexamined Patent Application Publication Nos. 2012-052137 and 2009-221311.

Polysaccharides are also known to have an anti-settling effect. Japanese Unexamined Patent Application Publication No. 2002-226819 discloses a technology in which a non-ionic and water-soluble cellulose, such as methyl cellulose or ethyl cellulose, is used as an anti-settling agent in an aqueous medium. Japanese Patent No. 3957596 mentions that methyl cellulose is added as a thickener to organopolysiloxane. These are because the cellulose dissolves or disperses in the water medium and "thickens" the system by constructing a weak hydrogen-bond network.

Materials such as amide waxes, polyamides, and urea are also known to construct a weak network of hydrogen bonds or other bonds and prevent settlement by forming such a network structure.

Adding these additives such as silica, however, disadvantageously increases the viscosity of the thermal grease. This translates into that one needs to use a smaller amount of thermally conductive filler to produce a thermal grease with a given viscosity. Moreover, the thermal conductivity of the grease will be low because of the smaller amount of thermally conductive filler.

Attempting to prevent the settlement of a thermally conductive filler according to these existing technologies therefore leads to increasing the viscosity of the composition. Such an attempt is thus considered impracticable in thermal grease and other applications in which high viscosity is unwanted.

CITATION LIST

Patent Literature

PTL 1: Japanese Unexamined Patent Application Publication No. 2005-330426
PTL 2: Japanese Unexamined Patent Application Publication No. 2012-052137
PTL 3: Japanese Unexamined Patent Application Publication No. 2009-221311
PTL 4: Japanese Unexamined Patent Application Publication No. 2012-052137
PTL 5: Japanese Unexamined Patent Application Publication No. 2009-221311
PTL 6: Japanese Unexamined Patent Application Publication No. 2002-226819
PTL 7: Japanese Patent No. 3957596

SUMMARY OF INVENTION

Technical Problem

The present invention has been made in light of these disadvantages. That is, an object of the present invention is to provide a thermally conductive silicone composition in which the settlement of thermally conductive filler(s) is limited with little increase in viscosity so that the filler(s) can be highly concentrated. Another object of the present invention is to provide a silicone composition in which the settlement of insoluble functionalizing filler(s) is limited with little increase in viscosity.

Solution to Problem

A silicone composition according to the present invention that achieves the above objects is configured as follows.

That is, the silicone composition is one that contains liquid silicone, at least one insoluble functionalizing filler, and a non-liquid anti-thickening anti-settling material.

The insoluble functionalizing filler gives the composition a predetermined function, and the non-liquid anti-thickening anti-settling material prevents the insoluble functionalizing filler from settling down with little increase in viscosity in the mixture with liquid silicone.

The silicone composition is one that contains 300 to 2500 parts by weight of the at least one insoluble functionalizing filler and 2.0 to 50 parts by weight of the anti-thickening anti-settling material per 100 parts by weight of the liquid silicone and has a viscosity of 30 to 700 Pa·S at 23° C.

Incorporating 300 to 2500 parts by weight of the insoluble functionalizing filler and 2.0 to 50 parts by weight of the anti-thickening anti-settling material per 100 parts by weight of the liquid silicone gives the silicone composition a viscosity of 30 to 700 Pa·S at 23° C., thereby rendering the composition suitable for coating and other such uses. Furthermore, the volume proportions of the insoluble functionalizing filler and anti-thickening anti-settling material in the silicone composition are well suited to preventing thickening and settlement, ensuring the composition has the function the manufacturer intends to give through the addition of the filler.

The silicone composition can be one in which the anti-thickening anti-settling material is a non-thickening anti-settling material.

By virtue of the use of a non-thickening anti-settling material as an anti-thickening anti-settling material, this silicone composition is excellent for coating and other such work. The non-thickening anti-settling material does not thicken the silicone composition despite its non-liquid nature.

The silicone composition can be one in which the at least one insoluble functionalizing filler contains 25% to 60% by volume particles with a particle diameter of more than 50 μm on the basis of a total volume of the filler.

The incorporation of 25% to 60% by volume particles with a particle diameter of more than 50 μm in the insoluble functionalizing filler, on the basis of the total volume of the filler, enhances a desired function, such as thermal conductivity. Furthermore, by virtue of containing the anti-thickening anti-settling material, this composition is limited in terms of the settlement of the insoluble functionalizing filler with no increase in viscosity, despite the relative propensity of the filler for precipitation due to its particle diameter, exceeding 50 μm.

The anti-thickening or non-thickening anti-settling material can be a polysaccharide.

By virtue of the use of a polysaccharide as an anti-thickening or non-thickening anti-settling material, this silicone composition is one in which the settlement of the insoluble functionalizing filler is limited with little increase in viscosity. That is, the inventors have found that polysaccharides, such as cellulose, do not thicken silicone compositions that contain liquid silicone and insoluble functionalizing filler(s). The inventors have also discovered that in this composition the insoluble functionalizing filler is effectively prevented from settling down despite with no increase in viscosity, a finding that goes against the conventional common knowledge.

The anti-thickening or non-thickening anti-settling material or polysaccharide can be a cellulose compound. The cellulose compound would improve moisture resistance.

The at least one insoluble functionalizing filler can be at least one thermally conductive filler. By virtue of the use of a thermally conductive filler as an insoluble functionalizing filler, this silicone composition has thermal conductivity.

The at least one thermally conductive filler can be at least one or more selected from metals, metal oxides, metal nitrides, metal hydroxides, metal carbides, graphite, and carbon fibers.

By virtue of the selection of metals, metal oxides, metal nitrides, metal hydroxides, metal carbides, graphite, and carbon fibers as thermally conductive fillers, this silicone composition is thermally conductive with little increase in viscosity in the mixture of liquid silicone and a non-liquid anti-thickening anti-settling material such as a polysaccharide.

The at least one insoluble functionalizing filler can be at least one or more selected from metals, metal oxides, and carbon compounds.

By virtue of the selection of metals, metal oxides, and carbon compounds as insoluble functionalizing fillers, this silicone composition is electrically conductive with little increase in viscosity in the mixture of liquid silicone and a non-liquid anti-thickening anti-settling material such as a polysaccharide.

Advantageous Effects of Invention

Silicone compositions according to the present invention provide silicone compositions in which the settlement of insoluble functionalizing filler(s), such as a thermally conductive filler, is limited with little increase in viscosity and therefore the filler(s) is highly concentrated.

DESCRIPTION OF EMBODIMENTS

The following describes a silicone composition according to the present invention. This silicone composition contains liquid silicone, insoluble functionalizing fillers, and a non-liquid anti-thickening anti-settling material. That is, base liquid silicone contains fillers that provide various functions selected according to the intended use, such as thermal conductivity, electrical conductivity, and strengthening capabilities, and this system further contains a non-liquid anti-thickening anti-settling material to limit the increase in the viscosity of the silicone composition. While the following describes this composition in further detail with reference to some embodiments, duplication of information will be avoided for any material, formulation, production process, operation, or other detail that is common across different embodiments.

Embodiment 1

This embodiment describes a form of a composition in which thermally conductive fillers, which gives the composition thermal conductivity, are used as insoluble functionalizing fillers. The thermally conductive silicone composition obtained by adding the thermally conductive fillers to liquid silicone can be used as a material that is interfaced between multiple heating elements on a substrate and a heat-dissipating element facing the heating elements and plays the role of transferring heat from the heating elements to the heat-dissipating element.

The thermally conductive silicone composition contains liquid silicone, thermally conductive fillers (insoluble functionalizing fillers), and a non-liquid anti-thickening anti-settling material.

The liquid silicone can be either a non-curable liquid silicone or a curable liquid silicone. If a non-curable liquid silicone is used, the thermally conductive silicone composition provides, for example, thermal grease. If a curable liquid silicone is used, the thermally conductive silicone composition provides, for example, potting material and thermal sheets.

Specific examples of liquid silicones include organopolysiloxanes such as dimethyl polysiloxane and methyl phenyl polysiloxane and modified silicones having reactive substituents such as alkenyl, epoxy, acryloyl, and amino groups.

The curable liquid silicone is preferably a curable liquid silicone of addition reaction type. This is because curable liquid silicones of addition reaction type have little cure shrinkage. More specifically, while curing a thermally conductive silicone composition sandwiched between a heating element and a heat-dissipating element can leave a space between the heating and heat-dissipating elements if the silicone has large cure shrinkage, this unfavorable formation of a space would be uncommon with a liquid silicone of addition reaction type because of its small cure shrinkage. The liquid silicone of addition reaction type is preferably an alkenyl-terminated organopolysiloxane and an organo-hydrogen polysiloxane. It should be noted that a curable liquid silicone that is a mixture of base and curing-agent liquid silicones like this addition-reaction liquid silicone includes all of the base, curing-agent, and mixed liquid silicones.

The liquid silicone can be one having a viscosity of approximately 0.005 Pa·s to 2 Pa·s. Liquid silicones having a viscosity of less than 0.005 Pa·s are of low molecular weight and difficult to have high molecular weights even in the cured state. The thermally conductive silicone composition may thus be fragile in its cured form. Although liquid silicones of lower viscosity can be used if they are not cured, liquid silicones having a viscosity of less than 0.005 Pa·s are highly volatile and no longer suitable for long-term use for thermal conductivity purposes. When the viscosity exceeds 2 Pa·s, it is likely that the thermally conductive silicone composition will have a high viscosity, and treating such a silicone composition to adjust its viscosity to a desired range will decrease the amount of thermally conductive fillers that can be contained. It is difficult to achieve high thermal conductivity in such cases.

The following describes the thermally conductive fillers. The thermally conductive fillers can be, for example, powders of metals, metal oxides, metal nitrides, metal carbides, metal hydroxides, or similar substances in the form of spheres, flakes, etc., or graphite or carbon fibers. Examples of metals include aluminum, copper, and nickel, examples of metal oxides include aluminum oxide, magnesium oxide, zinc oxide, and quartz, and examples of metal nitrides include boron nitride and aluminum nitride. An example of a metal carbide is silicon carbide, and an example of a metal hydroxide is aluminum hydroxide. Examples of carbon fibers include pitch carbon fiber, PAN carbon fiber, resin-carbonized fiber, and resin-graphitized fiber. In particular, powders of metal oxides, metal nitrides, metal carbides, and metal hydroxides are preferred, especially in applications where electrical insulation is desired.

The thermally conductive fillers are preferably materials of low specific gravity. More specifically, it is preferred to use materials having a specific gravity of 4.0 or less. Examples of materials having a specific gravity of 4.0 or less include aluminum, aluminum oxide, magnesium oxide, quartz, boron nitride, aluminum nitride, silicon carbide, aluminum hydroxide, graphite, and carbon fibers. It is more preferred that the specific gravity be 3.0 or less. Examples of materials having a specific gravity of 3.0 or less include aluminum, aluminum oxide, quartz, graphite, and carbon fibers. This is because thermally conductive fillers of low specific gravity are unlikely to precipitate compared to fillers of high specific gravity.

The thermally conductive fillers used here can be divided into thermally conductive filler (A), whose average particle diameter is 50 μm or less, and thermally conductive filler (B), whose average particle diameter is more than 50 μm. It is preferred that the thermally conductive filler with a particle diameter of more than 50 μm represents 25% to 60% by volume on the basis of the total volume of the thermally conductive fillers. This is because adjusting its proportion to such a predetermined range leads to an appropriate enhancement of thermal conductivity.

Assume that the proportion of thermally conductive filler (B), the filler of large particle diameter, is increased without changing the total amount (weight) of the two thermally conductive fillers (A) and (B). Up to approximately 60% by volume, it is expected that the thermally conductive silicone composition exhibits improvements in thermal conductivity with slight increases in viscosity. Beyond 60% by volume, thermal conductivity no longer improves. The thermally conductive silicone composition becomes less fluidic, and its surface starts to be noticeably rough. This is presumably because the proportion of thermally conductive particles of small diameter is too small for these particles to fill the spaces in the thermally conductive filler of large diameter. When the proportion of thermally conductive filler (B) is less than 25% by volume, however, it is difficult to achieve high thermal conductivity.

The average particle diameter of thermally conductive filler (A) is preferably between 0.3 μm and 10 μm. An average particle diameter of less than 0.3 μm may prevent the filler from being highly concentrated because of a viscosity higher than necessary. An average particle diameter of more than 10 μm makes it difficult for the filler to tightly fill the spaces in the large particle diameter.

The average particle diameter of thermally conductive filler (B) is preferably between 50 μm and 200 μm. An average particle diameter of less than 50 μm often leads to insufficient thermal conductivity. An average particle diameter of more than 200 μm may prevent the rate of settlement from being sufficiently slowed down, even by the anti-settling effect of crystalline cellulose or any such anti-thickening anti-settling material.

The average particle diameter of a thermally conductive filler can be expressed as a volume-average particle diameter in a particle size distribution as measured by laser diffraction (JIS R1629).

Although thermally conductive fillers (A) and (B) may be of the same material, they can be of different materials as described below.

For thermally conductive filler (A), it is preferred to incorporate aluminum hydroxide. Aluminum hydroxide limits the separation between the liquid polymer and thermally conductive fillers by reducing the specific gravity of the curable thermal grease.

As for thermally conductive filler (B), it is preferred to use aluminum oxide. Remarkably conductive to heat, aluminum oxide effectively increases thermal conductivity when used as thermally conductive filler (B), the filler of large particle diameter.

Thermally conductive filler (B) is preferably spherical in shape. This is because in the spherical shape, the filler would have a smaller specific surface area than in any other shape. That is, the small specific surface area means that the proportion of thermally conductive filler (B), the filler of large particle diameter, in the total amount of the thermally conductive fillers can be increased with little loss of fluidity of the curable thermal grease, and that therefore the amount of the thermally conductive fillers can be increased to enhance thermal conductivity.

The amount of the thermally conductive fillers is preferably in the range of 300 to 2500 parts by weight per 100 parts by weight of the liquid silicone. A filler content of less than 300 parts by weight often leads to insufficient thermal conductivity. A filler content exceeding 2500 parts by weight leads to too high a viscosity.

The following describes the anti-thickening anti-settling material. The anti-thickening anti-settling material used here is a material that prevents the settlement of insoluble functionalizing fillers by limiting the increase in the viscosity of the system to which it is added. Non-liquid anti-thickening anti-settling materials are in any non-liquid form, such as a solid or gel form, unlike low-viscosity liquids, which generally reduce the viscosity of the system to which they are added.

Among other anti-thickening anti-settling materials, non-thickening anti-settling materials prevent the settlement of insoluble functionalizing fillers by reducing the viscosity of the composition to which they are added to a level lower than would be without them. Non-thickening anti-settling materials, among other anti-thickening anti-settling materials, are therefore preferably used.

Examples of anti-thickening anti-settling materials include polysaccharides, such as cellulose compounds, starch, and dextrin. Polysaccharides are thickening agents in general, but in mixtures with liquid silicone, the behavior they exhibit is that of anti-thickening anti-settling materials, totally different from their known function as thickening agents.

Specific examples of cellulose compounds include cellulose (crystalline cellulose), methyl cellulose, hydroxymethyl cellulose, and carboxymethyl cellulose. Derivatives of these cellulose compounds obtained by introducing ionic substituents can also be used. It would be preferred to use a cellulose compound as a polysaccharide because this would provide excellent moisture resistance.

Specific examples of non-cellulose compounds include starch, glycogen, agarose, pectin, dextrin, fructan, and chitin.

The polysaccharides include those having a structure like a resin the surface of which is coated with a polysaccharide.

The polysaccharide used can be amorphous or in a fibrous shape and can have particle diameters from 1 to 1000 µm. There may be variations in such a particle size distribution, but polysaccharides in which powders with particle diameters of approximately 5 to 100 µm are predominant are preferred. The particle diameters can be checked through direct observation using an electronic microscope or other such equipment. The polysaccharide can alternatively be a polysaccharide gel.

The amount of the polysaccharide is preferably between 2.0 and 50 parts by weight, more preferably between 6.0 and 50 parts by weight, even more preferably between 6.0 and 20 parts by weight per 100 parts by weight of the liquid silicone. The polysaccharide has no anti-settling effect when present in an amount of 1.0 part by weight or less, and has an anti-settling effect when present in an amount of 2.0 to 50 parts by weight. When its amount is between 6.0 to 50 parts by weight, the polysaccharide is excellent in the prevention of settlement. The viscosity remains low when the polysaccharide content is between 2.0 and 50 parts by weight, but beyond 50 parts by weight, the amount of crystalline cellulose in the thermally conductive silicone composition is so large that thermal conductivity may be affected. Up to 20 parts by weight, thermal conductivity is more favorable.

The silicone composition, made up in such a way, may contain various additives unless its function is compromised. For example, dispersants, flame retardants, coupling agents, plasticizers, cure retardants, antioxidants, colorants, and catalysts may optionally be added.

Mixing the components described above and well stirring the mixture gives the silicone composition.

The thermally conductive silicone composition obtained in this way preferably has a viscosity of 30 Pa·s to 700 Pa·s at 23° C. The silicone composition has a low viscosity when its thermally conductive filler content is low, and if its viscosity is lower than 30 Pa·s, the composition may be of insufficient thermal conductivity. If its viscosity is more than 700 Pa·s, the silicone composition is difficult to apply.

The above viscosity can be measured using a viscometer (BROOKFIELD DV-E rotational viscometer) with the rotor of spindle No. 14 at a rotational speed of 5 rpm and a measurement temperature of 23° C.

Embodiment 2

This embodiment describes a form of a composition in which electrically conductive fillers, which give the composition electrical conductivity, are used as insoluble functionalizing fillers. The electrically conductive silicone composition obtained by adding the electrically conductive fillers to liquid silicone can be used as, for example, conductive paste.

The components other than the insoluble functionalizing fillers, proportions of components, and other details are the same as those of the silicone composition described in Embodiment 1.

Examples of fillers that can be used as the insoluble functionalizing fillers include one or more than one selected from metals, metal oxides, and carbon compounds. Such fillers also include any conductive filler used in the previous embodiment.

With regard to the electrically conductive fillers, too, it is preferred that its amount be in the range of 300 to 2500 parts by weight per 100 parts by weight of the liquid silicone. A filler content less than 300 parts by weight may cause the effect derived from the filler to be insufficient. A filler content exceeding 2500 parts by weight leads to too high a viscosity, which makes the composition difficult to use in applications in which something is coated with it.

Embodiment 3

This embodiment describes a form of a composition in which fillers that give the composition strength are used as insoluble functionalizing fillers. The silicone composition obtained by adding the strengthening fillers to liquid silicone can be used as, for example, a sealant with which building gaps or other such spaces are filled.

Examples of insoluble functionalizing fillers used to give the composition strength include the thermally or electrically conductive fillers described in the previous embodiments and other various fillers, such as calcium carbonate and silica. The components other than the insoluble functionalizing fillers, proportions of components, and other details are the same as those of the silicone composition described in Embodiment 1.

Variation:

While in each of the foregoing embodiments the insoluble functionalizing fillers include filler (A), whose average particle diameter is 50 μm or less, and thermally conductive filler (B), whose average particle diameter is more than 50 μm, a single thermally conductive filler can also be used. The filler may have any average particle diameter. Even in this case the anti-thickening anti-settling material effectively prevents settlement and limits thickening of the composition, allowing the insoluble functionalizing filler to be highly concentrated.

The foregoing embodiments are some examples of the present invention. The present invention is not limited to such embodiments and includes variations in the shape and material of the components of the individual compositions, production process, and so forth unless against its objects.

Examples

The silicone compositions of samples 1 to 17 described below were produced, and the degree of settlement of the insoluble functionalizing fillers, viscosity of the composition, and thermal conductivity were evaluated through studies. The individual samples are described first.

<Preparation of Samples>

Sample 1:

A base thermally conductive silicone composition for sample 1 was prepared by mixing the following materials: liquid silicone, 100 parts by weight of vinyl-terminated organopolysiloxane (viscosity at 25° C., 300 mPa·s), a base for liquid silicones of addition reaction type; thermally conductive fillers, 140 parts by weight of amorphous aluminum hydroxide powder with an average particle diameter of 1 μm (22.1% by volume based on all thermally conductive fillers), 200 parts by weight of spherical alumina with an average particle diameter of 3 μm (19.5% by volume based on all thermally conductive fillers), and 600 parts by weight of spherical alumina with an average particle diameter of 70 μm (58.4% by volume based on all thermally conductive fillers); and an anti-thickening anti-settling material (additive), 6 parts by weight of crystalline cellulose (average particle diameter, 50 μm; hereinafter referred to as cellulose (1)). The resulting composition is sample 1 in Table 1.

A curing-agent thermally conductive silicone composition was prepared by mixing the following materials: liquid silicone, 100 parts by weight of organo-hydrogen polysiloxane (viscosity at 25° C., 400 mPa·s), a curing agent for liquid silicones of addition reaction type; and the same amounts of the same thermally conductive fillers and additive as in the base above.

Samples 2 to 7:

Base thermally conductive silicone compositions for samples 2 to 7 were prepared in the same way as that for sample 1, except that cellulose (1) in the base thermally conductive silicone composition for sample 1 was changed to the additive given in Table 1.

Curing-agent thermally conductive silicone compositions for samples 2 to 7 were prepared in the same way as that for sample 1, except that the additive was changed to that for the base.

Samples 8 to 17:

Base thermally conductive silicone compositions for samples 8 to 17 were prepared in the same way as that for sample 1, except that cellulose (1) and/or its amount in the base thermally conductive silicone composition for sample 1 were changed to the additive and/or amount given in Table 2.

Curing-agent thermally conductive silicone compositions for samples 8 to 17 were prepared in the same way as that for sample 1, except that the additive and/or its amount were changed to those for the base.

TABLE 1

| No. | Additive | Amount | Viscosity Pa·s | Viscosity change | Settlement prevention | Thermal conductivity W/m·K |
|---|---|---|---|---|---|---|
| Sample 1 | Cellulose (1) | 6 | 410 | 0.91 | 4 | 3.1 |
| Sample 2 | Cellulose (2) | 6 | 399 | 0.89 | 4 | 3.1 |
| Sample 3 | Cellulose (3) | 6 | 402 | 0.89 | 4 | 3.1 |
| Sample 4 | Silica | 6 | 1152 | 2.56 | 5 | 3.1 |
| Sample 5 | Polybutene | 6 | 550 | 1.22 | 4 | 3.1 |
| Sample 6 | Terpene resin | 6 | 878 | 1.95 | 4 | 3.1 |
| Sample 7 | None | — | 450 | — | 1 | 3.1 |

TABLE 2

| No. | Additive | Amount | Viscosity Pa·s | Viscosity change | Settlement prevention | Thermal conductivity W/m·K |
|---|---|---|---|---|---|---|
| Sample 8 | Cellulose (1) | 0.5 | 445 | 0.99 | 1 | 3.1 |
| Sample 9 | Cellulose (1) | 1 | 429 | 0.95 | 2 | 3.1 |
| Sample 10 | Cellulose (1) | 2 | 424 | 0.94 | 3 | 3.1 |
| Sample 11 | Cellulose (1) | 10 | 415 | 0.92 | 4 | 3.1 |
| Sample 12 | Cellulose (1) | 20 | 423 | 0.94 | 4 | 3 |
| Sample 13 | Cellulose (1) | 50 | 430 | 0.96 | 4 | 2.6 |
| Sample 14 | Cellulose (1) | 80 | 458 | 1.02 | 4 | 2 |
| Sample 15 | Silica | 2 | 524 | 1.16 | 2 | 3.1 |
| Sample 16 | Polysaccharide (1) | 6 | 412 | 0.92 | 4 | 3.1 |
| Sample 17 | Polysaccharide (2) | 6 | 398 | 0.88 | 4 | 3.1 |

In Tables 1 and 2, cellulose (2) was carboxymethyl cellulose (average particle diameter, 50 μm), cellulose (3) was methyl cellulose (average particle diameter, 50 μm), the silica was AEROSIL COK 84 (Nippon Aerosil Co., Ltd.), the polybutene was Polybutene 10SH (NOF Corporation), the terpene resin was YS POLYSTER T100 (Yasuhara Chemical Co., Ltd.), polysaccharide (1) was starch (Wako Pure Chemical), and polysaccharide (2) was dextrin hydrate (Wako Pure Chemical).

Both of celluloses (2) and (3) were amorphous or fibrous and predominantly powders of approximately 5 to 100 μm; most of the particles were distributed within this range. Polysaccharides (1) and (2) were both amorphous and predominantly powders of approximately 1 to 100 μm; most of the particles were distributed within this range.

<Measurement and Evaluation of Samples>

Viscosity Measurement:

The viscosity of the base thermally conductive silicone compositions for samples 1 to 17 was measured using a viscometer (BROOK FIELD DV-E rotational viscometer) (with the rotor of spindle No. 14; rotational speed, 5 rpm; measurement temperature, 23° C.). The results are summarized in Tables 1 and 2.

Calculation of Change in Viscosity:

The base thermally conductive silicone compositions for samples 1 to 6 and 8 to 17, which contained an additive, were compared with that for sample 7, which contained no additive. The changes in viscosity (the viscosity values of the base thermally conductive silicone compositions for the individual samples divided by that of the base silicone composition for sample 7) are presented in Tables 1 and 2.

Settlement Test and Grading:

The base thermally conductive silicone compositions for samples 1 to 17 were loaded into separate cylindrical containers 20 mm across and 120 mm tall to a height of 100 mm and allowed to stand still under 60° C. conditions for 1000 hours. The samples were then visually inspected for the settlement of the thermally conductive fillers.

The degree of settlement in each sample was then graded into the five grades below. The results of this evaluation are summarized in Tables 1 and 2.

5: No separation.

4: No separation, but the surface looks smooth. (Liquid silicone has concentrated at the surface, making the particles of thermally conductive fillers less distinguishable.)

3: No separation, but the surface is covered with a thin film of liquid silicone. (There are no particles of thermally conductive fillers, exclusively on the surface.)

2: The extent of separation is such that liquid silicone can be decanted. (The separated liquid silicone has a thickness of 1 mm or more and less than 5 mm.)

1: The separated liquid silicone has a thickness of 5 mm or more.

Thermal Conductivity:

The base thermally conductive silicone compositions for samples 1 to 17 were mixed with the curing-agent thermally conductive silicone compositions for samples 1 to 17, respectively, and the resulting mixtures were thoroughly stirred. The resulting curable thermally conductive silicone compositions of samples 1 to 17 were each formed into a 20-mm thick sheet for use as a test specimen in the measurement of thermal conductivity. The thermal conductivity of each test specimen was measured by the transient hot-wire method using Kyoto Electronics Manufacturing QTM-500 quick thermal conductivity meter. The results of this measurement are also summarized in Tables 1 and 2.

<Discussion>

Viscosity and Anti-Settling Effect:

The base thermally conductive silicone compositions for samples 1 to 6 contained additives expected to be effective in preventing the settlement of thermally conductive fillers. These silicone compositions experienced no separation of thermally conductive fillers; an anti-settling effect was observed in all these compositions. In sample 7, which contained no additive, the thermally conductive fillers separated from liquid silicone and settled down.

Sample 7, which contained no additive, had a viscosity of 450 Pa·s. The viscosity values of the base thermally conductive silicone compositions for samples 1 to 3, which contained a cellulose compound, were all lower than this baseline of 450 Pa·s by approximately 10% (the changes in viscosity ranged from 0.89 to 0.90). Sample 4, which contained silica, had a considerably increased viscosity, 1152 Pa·s. Polybutene and terpene resin also resulted in a high viscosity.

These results indicate that the cellulose compounds used in samples 1 to 3 served as non-thickening anti-settling materials, materials that provide decreases in the viscosity of compositions to which they are added.

The base thermally conductive silicone compositions for samples 1 and 8 to 14, in which cellulose (1) was present in different amounts, were then compared. Samples 8 and 9, the cellulose content of which was 0.5 and 1.0 part by weight, respectively, experienced separation of thermally conductive fillers; the anti-settling effect was weak. Sample 10, the cellulose content of which was 2.0 parts by weight, appeared to have a thin layer of liquid silicone on its surface but it was not a separate layer; an anti-settling effect was observed. Samples 1 and 11 to 14, the cellulose content of which was 6.0 parts by weight or more, the thermally conductive fillers did not separate from liquid silicone; there was a superior anti-settling effect.

Among these samples containing cellulose (1), samples 1 and 8 to 13 had decreased viscosity values, demonstrating that the cellulose served as a non-thickening anti-settling material. In particular, samples 1, 11, and 12 had especially low viscosity values.

Sample 14 had a viscosity slightly increased as compared to that without the additive, demonstrating that the additive served as an anti-thickening anti-settling material but not as a non-liquid non-thickening anti-settling material. The viscosity increased in sample 14 as compared to sample 13, and this is presumably because the relative amount of the cellulose compound, or the solid content, with respect to liquid silicone was excessively large and, as a result, the relative amount of the fluidic component was too small.

Samples 16 and 17 also had decreased viscosity values, demonstrating that the additives served as non-thickening anti-settling materials.

From these results, it can be concluded that the amount of the polysaccharide such as a cellulose compound is preferably between 2.0 and 50 parts by weight, more preferably between 6.0 and 50 parts by weight.

Samples 4 and 15 contained silica. For sample 4, the additive content of which was the same as that of sample 1, there was an anti-settling effect but with a considerable increase in viscosity. As for sample 15, which contained a smaller amount of silica to achieve a lower viscosity, the viscosity did not decrease and silica failed to serve as an anti-thickening anti-settling material. Furthermore, the anti-settling effect was insufficient; the thermally conductive fillers separated out to such an extent that liquid silicone could be decanted.

Thermal Conductivity:

Samples 1 to 12, 16, and 17 exhibited comparable thermal conductivity values. The thermal conductivity was slightly lower in sample 13, which contained 50 parts by weight of cellulose (1), and significantly lower in sample 14, which contained 80 parts by weight of cellulose (1). The low thermal conductivity of sample 14 is presumably explained by the small proportion of the thermally conductive fillers per unit volume in the thermally conductive silicone composition. From these results, it can be concluded that the amount of the polysaccharide such as a cellulose compound is preferably 50 parts by weight or less, more preferably 20 parts by weight or less. It is therefore more preferred that the amount of the polysaccharide such as a cellulose compound be between 6.0 and 20 parts by weight.

INDUSTRIAL APPLICABILITY

As can be seen from the foregoing, the silicone compositions described above can be highly fluidic silicone compositions that contain insoluble functionalizing fillers selected for various functions, because insoluble fillers, which thicken the compositions to which they are added when present in large amounts, do not greatly increase viscosity, even at high concentrations. These silicone compositions can therefore be used as a substitute for thermal grease, electrically conductive paste, sealant, and other functional materials that lack fluidity or other desired functions.

The invention claimed is:

1. A silicone composition comprising liquid silicone, at least one insoluble functionalizing filler, and a non-liquid anti-thickening anti-settling material,
    wherein the anti-thickening anti-settling material is a cellulose compound, and
    wherein the composition contains 300 to 2500 parts by weight of the at least one insoluble functionalizing filler and 2.0 to 50 parts by weight of the anti-thickening anti-settling material per 100 parts by weight of the liquid silicone and
    wherein the composition has a viscosity of 30 to 700 Pa·S at 23° C.

2. The silicone composition according to claim 1, wherein the anti-thickening anti-settling material is a non-thickening anti-settling material.

3. The silicone composition according to claim 1, wherein the at least one insoluble functionalizing filler contains 25% to 60% by volume particles with a particle diameter of more than 50 μm on the basis of a total volume of the filler.

4. The silicone composition according to claim 1, wherein the at least one insoluble functionalizing filler is at least one thermally conductive filler.

5. The silicone composition according to claim 4, wherein the at least one insoluble functionalizing or thermally conductive filler is at least one selected from metals, metal oxides, metal nitrides, metal hydroxides, metal carbides, graphite, and carbon fibers, and the silicone composition is a thermally conductive silicone composition.

6. The silicone composition according to claim 1, wherein the at least one insoluble functionalizing filler is at least one selected from metals, metal oxides, and carbon compounds, and the silicone composition is an electrically conductive silicone composition.

7. The silicone composition according to claim 1, wherein the cellulose compound is at least any one of cellulose (crystalline cellulose), methyl cellulose, hydroxymethyl cellulose, carboxymethyl cellulose, and derivatives of these cellulose compounds.

* * * * *

UNITED STATES PATENT AND TRADEMARK OFFICE
CERTIFICATE OF CORRECTION

| | | |
|---|---|---|
| PATENT NO. | : 10,329,424 B2 | Page 1 of 1 |
| APPLICATION NO. | : 15/523567 | |
| DATED | : June 25, 2019 | |
| INVENTOR(S) | : Yasuyoshi Watanabe | |

It is certified that error appears in the above-identified patent and that said Letters Patent is hereby corrected as shown below:

On the Title Page

Please amend Item (73) Assignee as follows:
Assignee: Sekisui Polymatech Co., Ltd., Saitama (JP)

Signed and Sealed this
Thirtieth Day of July, 2019

Andrei Iancu
*Director of the United States Patent and Trademark Office*